United States Patent
Sun et al.

(10) Patent No.: US 12,088,487 B2
(45) Date of Patent: Sep. 10, 2024

(54) TRAFFIC MONITORING METHOD AND APPARATUS FOR OPEN STACK TENANT NETWORK

(71) Applicant: INSPUR SUZHOU INTELLIGENT TECHNOLOGY CO., LTD., Jiangsu (CN)

(72) Inventors: Xifa Sun, Shandong (CN); Yashuai Lei, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/270,417

(22) PCT Filed: Sep. 29, 2021

(86) PCT No.: PCT/CN2021/121906
§ 371 (c)(1),
(2) Date: Jun. 29, 2023

(87) PCT Pub. No.: WO2023/004992
PCT Pub. Date: Feb. 2, 2023

(65) Prior Publication Data
US 2024/0048468 A1    Feb. 8, 2024

(30) Foreign Application Priority Data

Jul. 27, 2021    (CN) .......................... 202110848075.5

(51) Int. Cl.
*G06F 15/173*    (2006.01)
*H04L 43/026*    (2022.01)
(Continued)

(52) U.S. Cl.
CPC ........ *H04L 43/0888* (2013.01); *H04L 43/026* (2013.01); *H04L 43/0817* (2013.01)

(58) Field of Classification Search
CPC .............. H04L 43/0888; H04L 43/026; H04L 43/0817
See application file for complete search history.

(56) References Cited

U.S. PATENT DOCUMENTS 5,043,989 A * 8/1991 Dalmas ................. H04L 1/0061
714/776
11,522,799 B1 * 12/2022 Koutsikos Tsatsalmas ...............
H04L 41/0627
(Continued)

FOREIGN PATENT DOCUMENTS

| CN | 105743734 A | 7/2016 |
| CN | 107276800 A | 10/2017 |

(Continued)

OTHER PUBLICATIONS

Corresponding International Patent Application No. PCT/CN2021/121906, International Search Report, Date Mailed Apr. 27, 2022.
(Continued)

*Primary Examiner* — Padma Mundur
(74) *Attorney, Agent, or Firm* — Cooper Legal Group, LLC

(57) ABSTRACT

A traffic monitoring method for an Open Stack tenant network, including: detecting a traffic in/out state of a first virtual machine by using a callback function; when it is detected that the virtual machine transmits first traffic to a second virtual machine in the same host, matching a first data flow corresponding to the first traffic by using target flow table entries in an integrated bridge, and transmitting a copied first data flow to a traffic monitoring platform; when it is detected that the first virtual machine transmits second traffic to a third virtual machine in a remote host, matching a second data flow corresponding to the second traffic by using the target flow table entries, and transmitting a copied second data flow to a physical bridge; and when the inte-
(Continued)

grated bridge receives the third data flow, transmitting the third data flow to the traffic monitoring platform.

17 Claims, 3 Drawing Sheets

(51) Int. Cl.
*H04L 43/0817* (2022.01)
*H04L 43/0888* (2022.01)

(56) References Cited

U.S. PATENT DOCUMENTS

| | | | |
|---|---|---|---|
| 2017/0250869 A1* | 8/2017 | Voellmy | H04L 43/14 |
| 2018/0145916 A1 | 5/2018 | Rao | |
| 2019/0036963 A1* | 1/2019 | Ahad | H04L 43/04 |
| 2019/0171474 A1 | 6/2019 | Malboubi et al. | |
| 2021/0168016 A1* | 6/2021 | Rao | H04L 43/12 |

FOREIGN PATENT DOCUMENTS

| | | |
|---|---|---|
| CN | 107623611 A | 1/2018 |
| CN | 107996023 A | 5/2018 |
| CN | 108494657 A | 9/2018 |
| CN | 109981613 A | 7/2019 |
| CN | 111431757 A | 7/2020 |
| CN | 111913782 A | 11/2020 |
| CN | 113300917 A | 8/2021 |

OTHER PUBLICATIONS

Corresponding International Patent Application No. PCT/CN2021/121906, Written Opinion, Date Mailed Apr. 27, 2022.
Corresponding Chinese Patent Application No. 202110848075.5, First Office Action, dated Sep. 3, 2021.
Corresponding Chinese Patent Application No. 202110848075.5, Notification to Grant Patent, dated Sep. 16, 2021.
Xu, Yi, et al., "Openstack Virtualization Platform Traffic Monitoring System", Computer Systems & Applications, 27(2), Feb. 28, 2018, pp. 51-57 with English abstract.

* cited by examiner

TRAFFIC MONITORING METHOD AND APPARATUS FOR OPEN STACK TENANT NETWORK

This application is the national phase application of International Application No. PCT/CN2021/121906, filed Sep. 29, 2021, which claims priority to Chinese Patent Application Ser. No. 202110848075.5, filed with China National Intellectual Property Administration on Jul. 27, 2021 and entitled "TRAFFIC MONITORING METHOD AND APPARATUS FOR OPEN STACK TENANT NETWORK" The contents of International Application No. PCT/CN2021/121906 and Chinese Patent Application No. 202110848075.5 are incorporated herein by reference in their entireties.

FIELD

The present application relates to the field of computer technologies, and in particular, to a traffic monitoring method, apparatus and device for an Open Stack tenant network, and a storage medium.

BACKGROUND

After enterprise cloudification, many enterprises no longer use physical machines on a large scale for service deployment, but adopt virtualization technology to perform unified pooling management on computing resources. Traditional traffic monitoring methods in data centers have become very mature, but traffic collection in cloud environments faces many challenges. Cloud computing and virtualization technologies have extended a boundary of a network to the interior of a physical server, and traffic interaction between different virtual machines no longer passes through a physical switch. Therefore, the traditional traffic monitoring methods are not applicable to virtual machines.

Therefore, how to monitor the traffic interaction between the virtual machines is an urgent technical problem for persons skilled in the art.

SUMMARY

In view of this, the present application aims to provide a traffic monitoring method and apparatus for an Open Stack tenant network, a device, and a medium, so as to monitor a traffic interaction between virtual machines. A specific solution is as follows:

A traffic monitoring method for an Open Stack tenant network includes:
  detecting a traffic in/out state of a first virtual machine in a first Open Stack host by using a callback function, the callback function being a function pre-registered in a Linux bridge in the first Open Stack host;
  when it is detected that the first virtual machine transmits first traffic to a second virtual machine in the first Open Stack host, matching a first data flow corresponding to the first traffic by using target flow table entries stored in an integrated bridge in the first Open Stack host, and transmitting a copied first data flow to a traffic monitoring platform, so as to monitor the first traffic;
  when it is detected that the first virtual machine transmits second traffic to a third virtual machine in a second Open Stack host, matching a second data flow corresponding to the second traffic by using the target flow table entries, and transmitting a copied second data flow to a physical bridge of the first Open Stack host;
  when the physical bridge receives the copied second data flow, performing reflex learning on the second data flow according to the target flow table entries to obtain a third data flow, and transmitting the third data flow to the integrated bridge; and
  when the integrated bridge receives the third data flow, transmitting the third data flow to the traffic monitoring platform, so as to monitor the second traffic.

In some embodiments, when the physical bridge receives the copied second data flow, a process of performing reflex learning on the second data flow according to the target flow table entries to obtain a third data flow, and transmitting the third data flow to the integrated bridge includes:
  when the physical bridge receives the copied second data flow, reflecting the copied second data flow to a target receiving port of the physical bridge according to the target flow table entries; and
  when the target receiving port receives the copied second data flow, performing L2 learning on the copied second data flow to obtain the third data flow, and transmitting the third data flow to the integrated bridge.

In some embodiments, the method further includes:
  checking the integrity of the copied first data flow and/or third data flow by using the traffic monitoring platform.

In some embodiments, the method further includes:
  transmitting the first traffic to the second virtual machine according to the first data flow; and
  transmitting the second traffic to the third virtual machine according to the second data flow.

In some embodiments, when the integrated bridge receives the third data flow, a process of transmitting the third data flow to the traffic monitoring platform, so as to monitor the second traffic includes:
  when the integrated bridge receives the third data flow, modifying vlan in the third data flow into a target vlan corresponding to the traffic monitoring platform, and transmitting the third data flow to the traffic monitoring platform through the target vlan, so as to monitor the second traffic.

In some embodiments, the method further includes:
  when an abnormality of the first traffic or the second traffic is monitored by using the traffic monitoring platform, prompting warning information.

In some embodiments, the method further includes:
  when an abnormality of an Internet protocol (IP) address and/or a media access control (MAC) address and/or a target port of the first virtual machine and/or the second virtual machine and/or the third virtual machine is monitored by the traffic monitoring platform, disabling the IP address and/or the MAC address and/or the target port.

Correspondingly, the present application further discloses a traffic monitoring apparatus for an Open Stack tenant network, including:
  a state detecting module, configured to detect a traffic in/out state of a first virtual machine in a first Open Stack host by using a callback function, the callback function being a function pre-registered in a Linux bridge in the first Open Stack host;
  a first monitoring module, configured to: when it is detected that the first virtual machine transmits first traffic to a second virtual machine in the first Open Stack host, match a first data flow corresponding to the first traffic by using target flow table entries stored in an integrated bridge in the first Open Stack host, and transmit a copied first data flow to a traffic monitoring platform to monitor the first traffic;

a data transmitting module, configured to: when it is detected that the first virtual machine transmits second traffic to a third virtual machine in a second Open Stack host, match a second data flow corresponding to the second traffic by using the target flow table entries, and transmit a copied second data flow to a physical bridge of the first Open Stack host;

a data processing module, configured to: when the physical bridge receives the copied second data flow, perform reflex learning on the second data flow according to the target flow table entries to obtain a third data flow, and transmit the third data flow to the integrated bridge; and a second monitoring module, configured to: when the integrated bridge receives the third data flow, transmit the third data flow to the traffic monitoring platform to monitor the second traffic.

Correspondingly, the present application further discloses a traffic monitoring device for an Open Stack tenant network, including:

a memory, configured to store a computer program; and a processor, configured to implement steps of the traffic monitoring method for an Open Stack tenant network disclosed above when executing the computer program.

Correspondingly, the present application further discloses a computer-readable storage medium. The computer-readable storage medium stores a computer program, and the computer program implements the steps of the traffic monitoring method for an Open Stack tenant network disclosed above when executed by a processor.

It might be seen that, in the present application, first the callback function is registered in the Linux bridge in the first Open Stack host, and a traffic in/out state of the first virtual machine in the first Open Stack host are detected by using the callback function; when it is detected that the first virtual machine transmits the first traffic to the second virtual machine in the first Open Stack host, the first data flow corresponding to the first traffic is matched by using the target flow table entries stored in the integrated bridge in the first Open Stack host, and the copied first data flow is transmitted to the traffic monitoring platform, so as to monitor the first traffic by using the traffic monitoring platform; when it is detected that the first virtual machine transmits second traffic to the third virtual machine in the second Open Stack host, the second data flow corresponding to the second traffic is matched by using the target flow table entries, and the copied second data flow is transmitted to the physical bridge of the first Open Stack host; when the physical bridge of the first Open stack host receives the copied second data flow, the reflex learning is performed on the second data flow according to the target flow table entries to obtain the third data flow, and the third data flow is transmitted to the integrated bridge in the first Open Stack host; and when the integrated bridge receives the third data flow, the third data flow is transmitted to the traffic monitoring platform, so as to monitor the second traffic by using the traffic monitoring platform. Apparently, a traffic interaction between virtual machines might be monitored by the method provided by the present application. Correspondingly, the traffic monitoring apparatus and device for an Open Stack tenant network, and the medium provided by the present application also have the above beneficial effects.

BRIEF DESCRIPTION OF THE DRAWINGS

In order to illustrate the embodiments of the present application or the technical solutions in the related art more clearly, the drawings that need to be used in the description of the embodiments or the related art will be briefly described below. It is apparent that the drawings in the following description are only embodiments of the present application, and other drawings might be obtained by those skilled in the art according to the provided drawings without creative work.

DETAILED DESCRIPTION

The technical solutions in the embodiments of the present application are clearly and completely described in the following with reference to the accompanying drawings in the embodiments of the present application. It is apparent that the described embodiments are merely a part of the embodiments of the disclosure, but not all of the embodiments. All other embodiments obtained by a person of ordinary skill in the art based on the embodiments of the present application without creative efforts shall fall within the protection scope of the present application.

Figure 1:
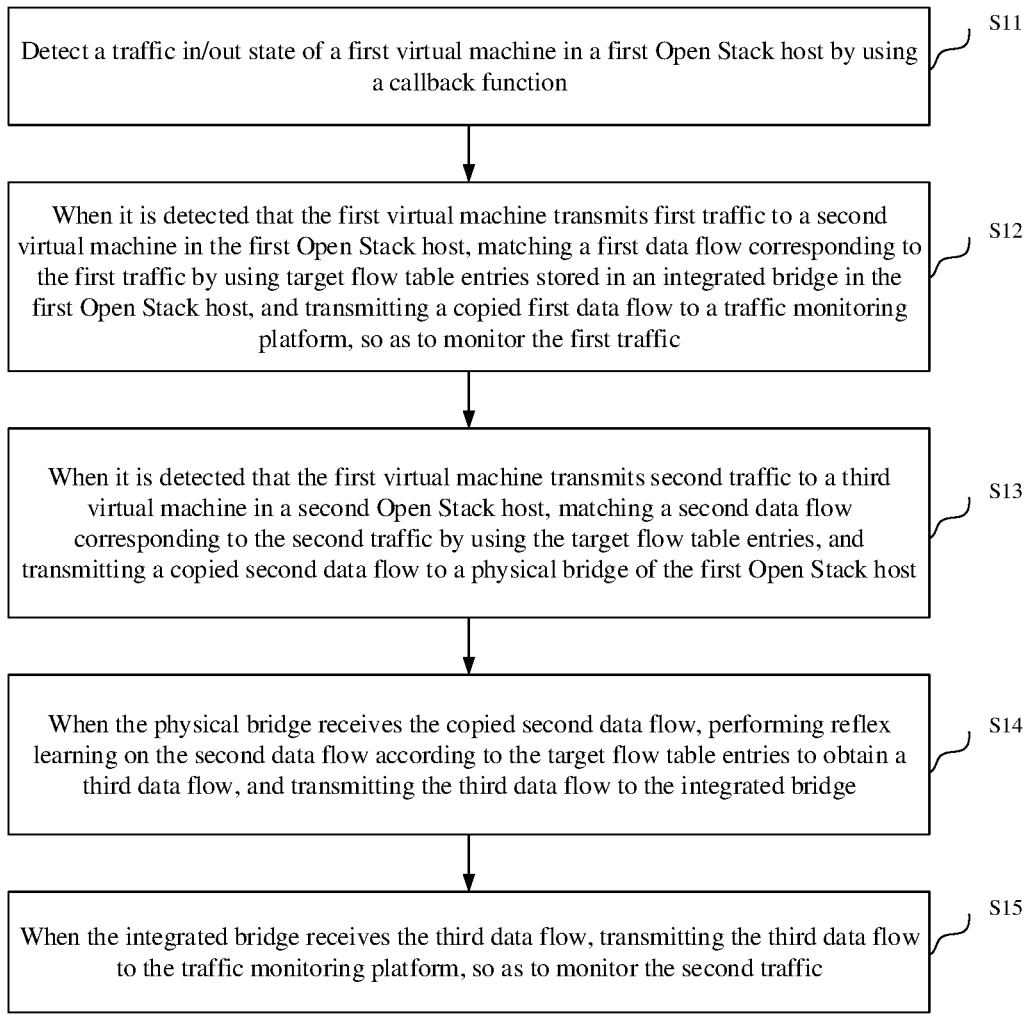
FIG. 1 is a flowchart of a traffic monitoring method for an Open Stack tenant network provided by an embodiment of the present application.

Refer to FIG. 1, which is a flowchart of a traffic monitoring method for an Open Stack tenant network provided by an embodiment of the present application. The method includes:

Step S11: detecting a traffic in/out state of a first virtual machine in a first Open Stack host by using a callback function, the callback function being a function pre-registered in a Linux bridge in the first Open Stack host;

Step S12: when it is detected that the first virtual machine transmits first traffic to a second virtual machine in the first Open Stack host, matching a first data flow corresponding to the first traffic by using target flow table entries stored in an integrated bridge in the first Open Stack host, and transmitting a copied first data flow to a traffic monitoring platform, so as to monitor the first traffic;

Step S13: when it is detected that the first virtual machine transmits second traffic to a third virtual machine in a second Open Stack host, matching a second data flow corresponding to the second traffic by using the target flow table entries, and transmitting a copied second data flow to a physical bridge of the first Open Stack host;

Step S14: when the physical bridge receives the copied second data flow, performing reflex learning on the second data flow according to the target flow table entries to obtain a third data flow, and transmitting the third data flow to the integrated bridge; and Step S15: when the integrated bridge receives the third data flow, transmitting the third data flow to the traffic monitoring platform, so as to monitor the second traffic.

Figure 2:
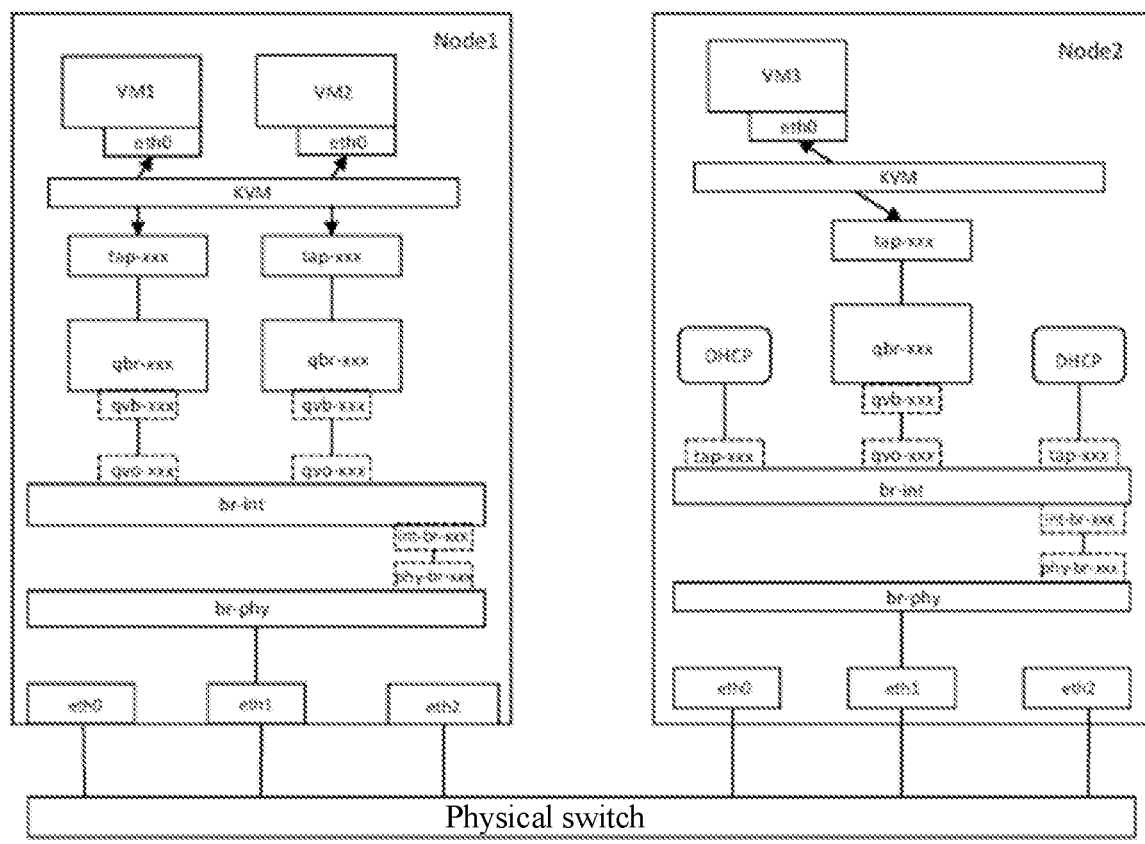
FIG. 2 is a schematic diagram of a model of an Open Stack tenant network.

In the present embodiment, in order to make persons skilled in the art better understand an implementation principle of the present application, a model of the Open Stack tenant network is introduced first. Refer to FIG. 2, which is a schematic diagram of a model of an Open Stack tenant network. In FIG. 2, Node1 and Node2 are respectively two physical hosts in an Open Stack tenant network. VM1 and VM2 are two virtual machines in Node1 of a first Open Stack host, and VM3 is a virtual machine in Node2 of a second Open Stack host, which belong to a virtual local area network (vlan) 100; and br-int is an integrated bridge, and br-phy is a physical bridge, which are configured to connect physical networks.

When VM1 transmits traffic to VM3, the traffic of VM1 will enter a Linux bridge qbr-xxx through a virtual network card tap-xxx. After that, the Linux bridge will transmit the traffic to the integrated bridge br-int through a pair of virtual devices qvb-xxx and qvo-xxx. The integrated bridge br-int will use flow table entries to specify how to transmit or forward data entering or leaving the integrated bridge br-int, and for the traffic entering the physical bridge br-phy, will complete conversion from an internal vlan ID to an external vlan ID through the flow table entries, whereby enabling the data entering the physical bridge br-phy to have a correct vlan ID. After that, the traffic will be directly transmitted to a physical switch through a physical network card eth1 in Node1, and the physical switch forwards the traffic to the physical network card eth1 in Node2 through physical settings. Thus, the traffic in VM1 is transmitted to VM3.

When VM3 returns traffic to VM1, the traffic returned by VM3 will be forwarded to the physical bridge br-phy through the physical network card eth1 of Node1, and then the physical bridge br-phy forwards the traffic to the integrated bridge br-int. After that, the integrated bridge br-int will convert the traffic according to the flow table entries, convert the external vlan into the internal vlan, and accurately transmit the data to virtual devices qvb-xxx and qvo-xxx corresponding to VM1 through the internal vlan ID, and remove the internal vlan ID. After the Linux bridge receives the traffic transmitted from the virtual devices qvb-xxx and qvo-xxx, the traffic will be transmitted to VM1 through a network tap device. VM1 will receive the traffic returned by VM3 through the virtual network card, and complete transmission of the data.

Based on architecture of an existing Open Stack tenant network, the present embodiment provides a traffic monitoring method for an Open Stack tenant network. A traffic interaction between virtual machines may be monitored by the method. It might be seen from the architecture of the above Open Stack tenant network that a critical network device of the virtual machine is a tap-xxx network connected to a Linux bridge. The Linux bridge is a device for tcp/ip layer 2 protocol switching on Linux, and is functionally similar to a switch in the real world. The Linux bridge may be connected to other network devices on Linux, and functions of the Linux bridge are mainly realized in a kernel. When a slave device is connected to the Linux bridge, it is equivalent to that a network cable connected to a terminal is plugged into a port of the switch in the real world. At this moment, in a kernel program, netdev_rx_handler_register( ) is called, a function used for receiving data is registered. After that, whenever the data is received from this device, this function will be called, and the data will be forwarded to the Linux bridge through this function.

Through the above theoretical analysis, in this monitoring method, it is necessary to register a callback function in the Linux bridge in the first Open Stack host in advance, so as to detect the traffic in/out state of the virtual machine by using the callback function. In some embodiments, when receiving the traffic or transmitting the traffic to other devices, the first virtual machine VM1 will report heartbeat information to the callback function, so as to represent that the first virtual machine VM1 is receiving or transmitting data. Thus, ongoing data transmission of the virtual machine may be monitored based on the data flow and a flow direction of the virtual machine. It is to be noted that the callback function can only complete a simple traffic triggering action and cannot perform an actual data operation, so any impact cannot be generated on data processing of the virtual network in a traffic detecting process. After the callback function is inserted into the Linux bridge, in order to monitor the network interaction between the virtual machines, it is also necessary to insert the target flow table entries in the integrated bridge br-int, and to associate a port to the integrated bridge to mirror traffic data entering and exiting the integrated bridge to a target port of the traffic monitoring platform, so as to achieve a purpose of monitoring the traffic entering and exiting the virtual machine.

In some embodiments, in this traffic monitoring method, first, the traffic in/out state of the first virtual machine VM1 in the first Open Stack host is detected by using the callback function. When it is detected that the first virtual machine VM1 transmits first traffic to the second virtual machine VM2 in the same physical host, then the first data flow corresponding to the first traffic is matched by using the target flow table entries stored in the integrated bridge br-int in the first Open Stack host, and the first data flow is copied. After that, the copied first data flow is transmitted to a third-party traffic monitoring platform, so as to monitor the first traffic between the first virtual machine VM1 and the second virtual machine VM2 by using the traffic monitoring platform. Apparently, a purpose of monitoring a traffic interaction between different virtual machines in the same Open Stack host might be monitored in such an arrangement manner.

It might be imagined that in addition to that different virtual machines in the same Open Stack host may perform traffic interaction, virtual machines in different Open Stack hosts may also perform traffic interaction. Therefore, when it is detected the first virtual machine VM1 transmits second traffic to a third virtual machine VM3 in a second Open Stack host by using the callback function inserted into the Linux bridge in the first Open Stack host, a second data flow corresponding to the second traffic is matched by using the target flow table entries stored in the integrated bridge br-int of the first Open Stack host, and the second data flow is copied to obtain a copied second data flow.

It might be understood that after the second data flow is copied, it will be found that a target port of the second traffic is not in a local host according to the second data flow. Therefore, the integrated bridge br-int will transmit the copied second data flow to a physical bridge br-phy in the first Open Stack host. When the physical bridge br-phy receives the copied second data flow, reflex learning will be performed on the second data flow according to the target flow table entries, whereby enabling the second traffic to be transmitted from the first virtual machine VM1 to the third virtual machine VM3. In some embodiments, a third data flow will be obtained after the physical bridge br-phy performs the reflex learning on the second data flow according to the target flow table entries. After that, the physical bridge br-phy will transmit the third data flow to the integrated bridge br-int. When the integrated bridge br-int receives the third data flow, the third data flow will be transmitted to a third-party traffic monitoring platform, so as to monitor the second traffic between the first virtual machine VM1 and the third virtual machine VM3 by using the third-party traffic monitoring platform.

Apparently, through the technical solutions provided by the present embodiment, not only the traffic interaction between the virtual machines in the same Open Stack host might be monitored, but also the traffic interaction between virtual machines in a remote Open Stack host might be monitored, thereby achieving a purpose of monitoring the traffic of the virtual machines. Moreover, the problem location and troubleshooting efficiency of an Open Stack network tenant might be effectively improved through the traffic monitoring method provided by the present embodiment.

In some embodiments, in a practical application, the traffic monitoring platform may be set as Traffic Monitor, Traffic Monitor is not only open source and free traffic monitoring software for Windows platform, but also capable of displaying the monitored information in a taskbar thereof or a floating window on a desktop in real time, whereby facilitating viewing the traffic interaction between the virtual machines by a user in real time. Therefore, the convenience of the user when using the traffic monitoring platform might be improved.

It might be seen that, in the present application, first the callback function is registered in the Linux bridge in the first Open Stack host, and traffic in/out state of the first virtual machine in the first Open Stack host are detected by using the callback function; when it is detected that the first virtual machine transmits the first traffic to the second virtual machine in the first Open Stack host, the first data flow corresponding to the first traffic is matched by using the target flow table entries stored in the integrated bridge in the first Open Stack host, and the copied first data flow is transmitted to the traffic monitoring platform, so as to monitor the first traffic by using the traffic monitoring platform; when it is detected that the first virtual machine transmits second traffic to the third virtual machine in the second Open Stack host, the second data flow corresponding to the second traffic is matched by using the target flow table entries, and the copied second data flow is transmitted to the physical bridge of the first Open Stack host; when the physical bridge of the first Open stack host receives the copied second data flow, the reflex learning is performed on the second data flow according to the target flow table entries to obtain the third data flow, and the third data flow is transmitted to the integrated bridge in the first Open Stack host; and when the integrated bridge receives the third data flow, the third data flow is transmitted to the traffic monitoring platform, so as to monitor the second traffic by using the traffic monitoring platform. Apparently, a traffic interaction between virtual machines might be monitored by the method provided by the present embodiment.

Based on the above embodiment, the present embodiment further describes and optimizes the technical solutions. As a preferred implementation, the above steps: when the physical bridge receives the copied second data flow, a process of performing reflex learning on the second data flow according to the target flow table entries to obtain a third data flow, and transmitting the third data flow to the integrated bridge includes:

when the physical bridge receives the copied second data flow, reflecting the copied second data flow to a target receiving port of the physical bridge according to the target flow table entries; and when the target receiving port receives the copied second data flow, performing L2 learning on the copied second data flow to obtain the third data flow, and transmitting the third data flow to the integrated bridge.

In some embodiments, when the physical bridge in the first Open Stack host receives the copied second data flow, the copied second data flow will be transmitted to the target receiving port of the physical bridge according to the target flow table entries; when the target receiving port of the physical bridge receives the second data flow, L2 learning will be performed on the second data flow, so as to obtain the third data flow that can transmit the second traffic from the first virtual machine to the third virtual machine; and after the physical bridge acquires and obtains the third data flow, the third data flow will be transmitted to the integrated bridge, so as to transmit the copied second traffic to the traffic monitoring platform through the integrated bridge.

Apparently, it might be ensured that the traffic monitoring platform can monitor a traffic interaction between the first virtual machine and the third virtual machine through the technical solution provided by the present application.

Based on the above embodiments, the present embodiment further describes and optimizes the technical solutions. In some embodiments, the above traffic monitoring method for an Open Stack tenant network further includes:

the integrity of the copied first data flow and/or third data flow are/is checked by using the traffic monitoring platform.

It might be imagined that data may sometimes be tampered by lawbreakers or may lose during transmission, whereby affecting a monitoring result of the traffic of the virtual machine by a traffic monitoring platform. Therefore, in the present embodiment, in order to avoid the above situation, the traffic monitoring platform may also check the integrity of the copied first data flow and third data flow when receiving the copied first data flow or third data flow.

A method for the traffic monitoring platform to check the integrity of the copied first data flow and/or third data flow includes, but is not limited to, parity check, block check character (BCC), or cyclic redundancy check (CRC), and the like.

Moreover, compared with directly checking the integrity of the first traffic or the second traffic transmitted by the first virtual machine by the traffic monitoring platform, the checking and detecting method provided by the present embodiment can achieve a purpose of checking the integrity of the data. Furthermore, the transmission performance of the traffic data cannot be affected, thereby relatively improving the efficiency of monitoring the traffic of the virtual machine.

Apparently, the accuracy and the reliability when the traffic monitoring platform monitors the traffic of the virtual machine may further be ensured through the technical solution provided by the present application.

Based on the above embodiments, the present embodiment further describes and optimizes the technical solutions. In some embodiments, the above traffic monitoring method for an Open Stack tenant network further includes:

the first traffic is transmitted to the second virtual machine according to the first data flow; and the second traffic is transmitted to the third virtual machine according to the second data flow.

It might be understood that the first data flow corresponding to the first traffic might be matched by using the target flow table entries, so the first data flow will contain a transmission path of the first traffic from the first virtual machine to the second virtual machine. Therefore, in order to transmit the first traffic of the first virtual machine to the second virtual machine, it is necessary to transmit the first traffic to the second virtual machine according to the first data flow.

Similarly, when it is detected that the first virtual machine transmits the second traffic to the third virtual machine in the second Open Stack host by using the callback function, the second data flow corresponding to the second traffic will be matched by the target flow table entries stored in the integrated bridge in the first Open Stack host. Therefore, after the second data flow corresponding to the second traffic is matched by using the target flow table entries, the second traffic of the first virtual machine may be transmitted into the third virtual machine in the second Open stack according to a transmission path and a transmission rule in the second data flow.

It might be seen that, through the technical solutions provided by the present embodiment, not only the data interaction between different virtual machines in the same Open Stack host might be implemented, but also the data interaction between different virtual machines in a remote Open Stack host might be implemented.

Based on the above embodiments, the present embodiment further describes and optimizes the technical solutions. In some embodiments, the above step: when the integrated bridge receives the third data flow, a process of transmitting the third data flow to the traffic monitoring platform, so as to monitor the second traffic includes:

when the integrated bridge receives the third data flow, modifying vlan in the third data flow into a target vlan corresponding to the traffic monitoring platform, and transmitting the third data flow to the traffic monitoring platform through the target vlan, so as to monitor the second traffic.

In the present embodiment, when the integrated bridge receives the third data flow, the vlan in the third data flow will be modified into the target vlan corresponding to the traffic monitoring platform, which is equivalent to establishing a channel connection between the integrated bridge and the traffic monitoring platform. In this case, the third data flow may be transmitted to the traffic monitoring platform through the target vlan, and the traffic interaction between the first virtual machine and the third virtual machine is monitored by using the traffic monitoring platform.

Apparently, through the technical solution provided by the present application, the overall reliability of the traffic monitoring platform during monitoring the second traffic might be ensured.

Based on the above embodiments, the present embodiment further describes and optimizes the technical solutions. In some embodiments, the above traffic monitoring method for an Open Stack tenant network further includes:

when an abnormality of the first traffic or the second traffic is monitored by using the traffic monitoring platform, warning information is prompted.

In a practical application, when an abnormality of the first traffic transmitted by the first virtual machine to the second virtual machine or the second traffic transmitted by the first virtual machine to the third virtual machine is detected by the traffic monitoring platform, for example, a large amount of retransmission data, invalid data, error data, and the like occurring in the first traffic or the second traffic, it indicates that there is a faulty component or an abnormal thread in a system.

In this case, maintenance personnel might be informed of the traffic transmission among various virtual machines timely in a manner of prompting the warning information and take corresponding remedial measures, whereby the economic loss suffered by a user might be greatly reduced.

Based on the above embodiments, the present embodiment further describes and optimizes the technical solutions.

In some embodiments, the above traffic monitoring method for an Open Stack tenant network further includes:

when an abnormality of an Internet protocol (IP) address and/or a media access control (MAC) address and/or a target port of the first virtual machine and/or the second virtual machine and/or the third virtual machine is monitored by using the traffic monitoring platform, the IP address and/or the MAC address and/or the target port is disabled.

It might be understood that, when the abnormality of the Internet protocol (IP) address and/or the media access control (MAC) address and/or the target port of the first virtual machine and/or the second virtual machine and/or the third virtual machine is monitored by the traffic monitoring platform, it indicates that the first virtual machine and/or the second virtual machine and/or the third virtual machine cannot perform normal data transmission work. At this moment, if the traffic data is continued to be transmitted by using the IP address and/or the MAC address and/or the target port of the first virtual machine and/or the second virtual machine and/or the third virtual machine, it will not only increase the transmission amount of erroneous data, but also increase the security risk of the first Open Stack host and/or second Open Stack host.

Therefore, in the present embodiment, in order to avoid the above situation, the IP address and/or the MAC address and/or the target port of the first virtual machine and/or the second virtual machine and/or the third virtual machine is disabled when the abnormality of the IP address and/or the MAC address and/or the target port of the first virtual machine and/or the second virtual machine and/or the third virtual machine is monitored by the traffic monitoring platform, that is, the use of a failed IP address and/or MAC address and/or target port is paused.

Apparently, through the technical solution provided by the present application, the overall reliability of each virtual machine during data interaction may further be improved.

Figure 3:
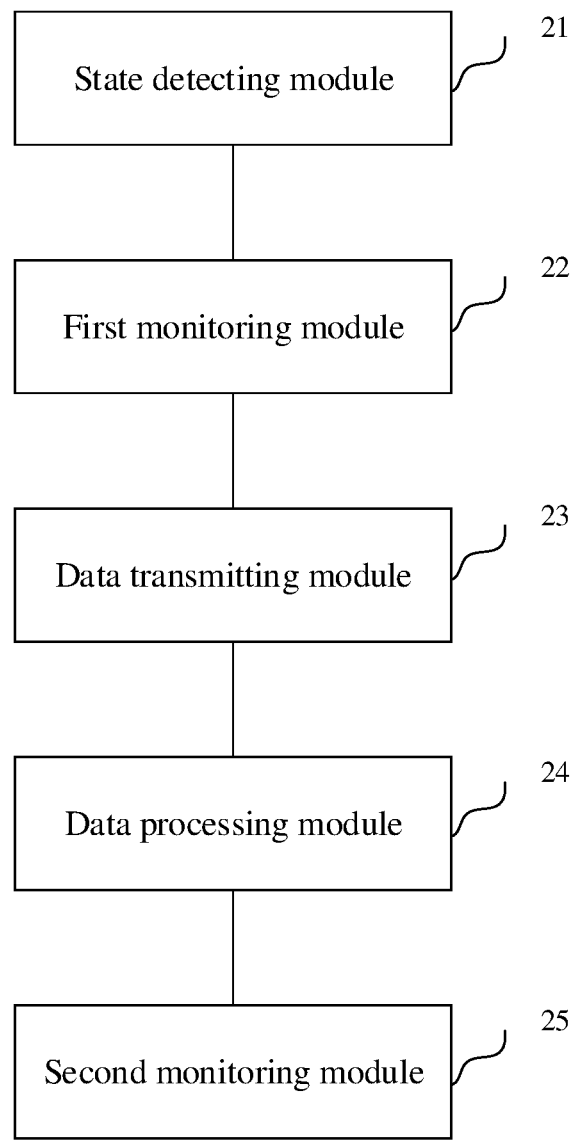
FIG. 3 is a structural diagram of a traffic monitoring apparatus for an Open Stack tenant network provided by an embodiment of the present application.

Refer to FIG. 3, which is a structural diagram of a traffic monitoring apparatus for an Open Stack tenant network provided by an embodiment of the present application.

The apparatus includes:

a state detecting module 21, configured to detect a traffic in/out state of a first virtual machine in a first Open Stack host by using a callback function, the callback function being a function pre-registered in a Linux bridge in the first Open Stack host;

a first monitoring module 22, configured to: when it is detected that the first virtual machine transmits first traffic to a second virtual machine in the first Open Stack host, match a first data flow corresponding to the first traffic by using target flow table entries stored in an integrated bridge in the first Open Stack host, and transmit a copied first data flow to a traffic monitoring platform to monitor the first traffic;

a data transmitting module 23, configured to: when it is detected that the first virtual machine transmits second traffic to a third virtual machine in a second Open Stack host, match a second data flow corresponding to the second traffic by using the target flow table entries, and transmit a copied second data flow to a physical bridge of the first Open Stack host;

a data processing module 24, configured to: when the physical bridge receives the copied second data flow, perform reflex learning on the second data flow according to the target flow table entries to obtain a third data flow, and transmit the third data flow to the integrated bridge; and a second monitoring module 25, configured to: when the integrated bridge receives the third data flow, transmit the third data flow to the traffic monitoring platform, so as to monitor the second traffic.

The traffic monitoring apparatus for an Open Stack tenant network provided by an embodiment of the present application has the beneficial effects of the traffic monitoring apparatus for an Open Stack tenant network disclosed above.

Figure 4:
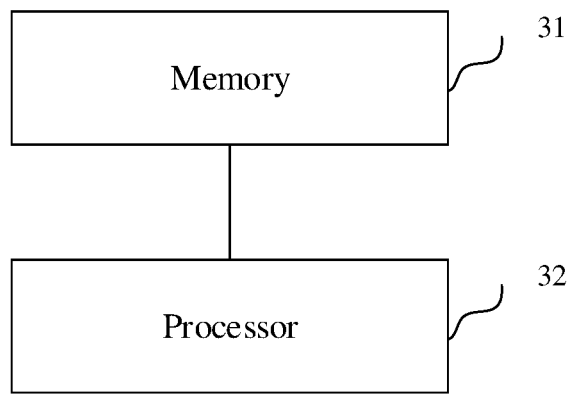
FIG. 4 is a structural diagram of a traffic monitoring device for an Open Stack tenant network provided by an embodiment of the present application.

Refer to FIG. 4, which is a structural diagram of a traffic monitoring device for an Open Stack tenant network provided by an embodiment of the present application. The device includes:

a memory 31, configured to store a computer program;

a processor 32, configured to implement steps of the traffic monitoring method for an Open Stack tenant network disclosed above when executing the computer program.

The traffic monitoring device for an Open Stack tenant network provided by an embodiment of the present application has the beneficial effects of the traffic monitoring method for an Open Stack tenant network disclosed above.

Correspondingly, the embodiment of the present application further discloses a computer-readable storage medium. The computer-readable storage medium stores a computer program, and the computer program implements the steps of the traffic monitoring method for an Open Stack tenant network disclosed above when executed by a processor.

A computer-readable storage medium provided by the embodiment of the present application has the beneficial effects of the traffic monitoring method for an Open Stack tenant network disclosed above.

Various embodiments in the present specification are described in a progressive manner. Each embodiment focuses on differences from other embodiments, and the same and or similar parts of various embodiments may be referred to one another. The apparatus disclosed by the embodiment is described relatively simply since it corresponds to the method disclosed by the embodiment, and for relevant points may refer to the description of a method section.

Finally, it is also to be noted that relational terms such as first and second are used merely to distinguish one entity or operation from another entity or operation herein, and do not necessarily require or imply the existence of any such actual relationship or order between these entities or operations. Moreover, the terms "include", "contain" or any other variations thereof are intended to cover a non-exclusive inclusion, such that a process, method, article or device including a series of elements not only includes those elements, but also includes those elements that are not explicitly listed, or includes elements inherent to such a process, method, article or device. In the absence of more restrictions, elements defined by the phrase "include a/an . . . " do not exclude the existence of additional identical elements in the process, method, commodity, or device that includes the elements.

The above is a detailed description of the traffic monitoring method, apparatus, and device for an Open Stack tenant network, and a medium provided by the embodiments of the present application. The principles and implementations of the present application are described with specific examples herein. The description of the above embodiments is only for helping to understand the method of the present application and its core ideas. Meanwhile, for those of ordinary skill in the art, according to the idea of the present application, there will be changes in specific implementations and application scopes. In conclusion, the present specification should not be construed as a limitation to the present application.

What is claimed is:

1. A traffic monitoring method for an Open Stack tenant network, comprising:

detecting a traffic in or out state of a first virtual machine in a first Open Stack host by using a callback function, the callback function being a function pre-registered in a Linux bridge in the first Open Stack host;

when it is detected that the first virtual machine transmits first traffic of the traffic to a second virtual machine in the first Open Stack host, matching a first data flow corresponding to the first traffic by using target flow table entries stored in an integrated bridge in the first Open Stack host, and transmitting a copied first data flow to a traffic monitoring platform, so as to monitor the first traffic;

when it is detected that the first virtual machine transmits second traffic of the traffic to a third virtual machine in a second Open Stack host, matching a second data flow corresponding to the second traffic by using the target flow table entries, and transmitting a copied second data flow to a physical bridge of the first Open Stack host;

when the physical bridge receives the copied second data flow, reflecting the copied second data flow to a target receiving port of the physical bridge according to the target flow table entries;

when the target receiving port receives the copied second data flow, performing L2 learning on the copied second data flow to obtain a third data flow, and transmitting the third data flow to the integrated bridge; and when the integrated bridge receives the third data flow, transmitting the third data flow to the traffic monitoring platform, so as to monitor the second traffic.

2. The traffic monitoring method according to claim 1, further comprising:

checking an integrity of at least one of the copied first data flow or the third data flow by using the traffic monitoring platform.

3. The traffic monitoring method according to claim 1, further comprising:

transmitting the first traffic to the second virtual machine according to the first data flow; and transmitting the second traffic to the third virtual machine according to the second data flow.

4. The traffic monitoring method according to claim 1, wherein the when the integrated bridge receives the third data flow, transmitting the third data flow to the traffic monitoring platform, so as to monitor the second traffic comprises:

when the integrated bridge receives the third data flow, modifying a vlan in the third data flow into a target vlan corresponding to the traffic monitoring platform, and transmitting the third data flow to the traffic monitoring platform through the target vlan, so as to monitor the second traffic.

5. The traffic monitoring method according to claim 1, further comprising:

when an abnormality of the first traffic or the second traffic is monitored by using the traffic monitoring platform, prompting warning information.

6. The traffic monitoring method according to claim 1, further comprising:

when an abnormality of at least one of an Internet protocol (IP) address, a media access control (MAC) address, or a target port of at least one of the first virtual machine, or the second virtual machine, or the third virtual machine is monitored by the traffic monitoring platform, disabling the at least one of the IP address, the MAC address, or the target port.

7. A traffic monitoring device for an Open Stack tenant network, comprising:
a memory, storing a computer program; and
a processor, configured to execute the computer program, and upon execution of the computer program, the processor is configured to:
detect a traffic in or out state of a first virtual machine in a first Open Stack host by using a callback function, the callback function being a function pre-registered in a Linux bridge in the first Open Stack host;
when it is detected that the first virtual machine transmits first traffic of the traffic to a second virtual machine in the first Open Stack host, match a first data flow corresponding to the first traffic by using target flow table entries stored in an integrated bridge in the first Open Stack host, and transmit a copied first data flow to a traffic monitoring platform, so as to monitor the first traffic;
when it is detected that the first virtual machine transmits second traffic of the traffic to a third virtual machine in a second Open Stack host, match a second data flow corresponding to the second traffic by using the target flow table entries, and transmit a copied second data flow to a physical bridge of the first Open Stack host;
when the physical bridge receives the copied second data flow, reflect the copied second data flow to a target receiving port of the physical bridge according to the target flow table entries;
when the target receiving port receives the copied second data flow, perform L2 learning on the copied second data flow to obtain a third data flow, and transmitting the third data flow to the integrated bridge; and
when the integrated bridge receives the third data flow, transmit the third data flow to the traffic monitoring platform, so as to monitor the second traffic.

8. A non-transitory computer-readable storage medium, storing a computer program executable by a processor, wherein upon execution by the processor, the computer program is configured to cause the processor to:
detect a traffic in or out state of a first virtual machine in a first Open Stack host by using a callback function, the callback function being a function pre-registered in a Linux bridge in the first Open Stack host;
when it is detected that the first virtual machine transmits first traffic of the traffic to a second virtual machine in the first Open Stack host, match a first data flow corresponding to the first traffic by using target flow table entries stored in an integrated bridge in the first Open Stack host, and transmit a copied first data flow to a traffic monitoring platform, so as to monitor the first traffic;
when it is detected that the first virtual machine transmits second traffic of the traffic to a third virtual machine in a second Open Stack host, match a second data flow corresponding to the second traffic by using the target flow table entries, and transmit a copied second data flow to a physical bridge of the first Open Stack host;
when the physical bridge receives the copied second data flow, reflect the copied second data flow to a target receiving port of the physical bridge according to the target flow table entries;
when the target receiving port receives the copied second data flow, perform L2 learning on the copied second data flow to obtain a third data flow, and transmitting the third data flow to the integrated bridge; and
when the integrated bridge receives the third data flow, transmit the third data flow to the traffic monitoring platform, so as to monitor the second traffic.

9. The traffic monitoring method according to claim 1, wherein the detecting a traffic in or out state of a first virtual machine in a first Open Stack host by using a callback function comprises:
in response to the first virtual machine receiving the traffic or transmitting the traffic to other devices, reporting, by the first virtual machine, heartbeat information to the callback function, so as to detect the traffic in or out state of the first virtual machine in the first Open Stack host.

10. The traffic monitoring method according to claim 1, further comprising:
displaying monitored information in a taskbar or a floating window on a desktop in real time.

11. The traffic monitoring method according to claim 2, wherein the checking an integrity of at least one of the copied first data flow or the third data flow by using the traffic monitoring platform comprises:
checking the integrity of the at least one of the copied first data flow or the third data flow through parity check, block check character (BCC), or cyclic redundancy check (CRC) by using the traffic monitoring platform.

12. The traffic monitoring method according to claim 1, wherein the first data flow comprises a first transmission path of the first traffic from the first virtual machine to the second virtual machine.

13. The traffic monitoring method according to claim 1, wherein the second data flow comprises a second transmission path and a transmission rule of the second traffic from the first virtual machine to the third virtual machine.

14. The traffic monitoring method according to claim 5, wherein the when an abnormality of the first traffic or the second traffic is monitored by using the traffic monitoring platform, prompting warning information comprises:
in response to retransmission data, invalid data, or error data occurring in the first traffic or the second traffic, prompting the warning information.

15. The traffic monitoring device for an Open Stack tenant network according to claim 7, wherein the processor, upon execution of the computer program, is further configured to:
check an integrity of at least one of the copied first data flow or the third data flow by using the traffic monitoring platform.

16. The traffic monitoring device for an Open Stack tenant network according to claim 7, wherein the processor, upon execution of the computer program, is further configured to:
when the integrated bridge receives the third data flow, modify a vlan in the third data flow into a target vlan corresponding to the traffic monitoring platform, and transmit the third data flow to the traffic monitoring platform through the target vlan, so as to monitor the second traffic.

17. The non-transitory computer-readable storage medium according to claim 8, wherein the computer program is further configured to cause the processor to:

check an integrity of at least one of the copied first data flow or the third data flow by using the traffic monitoring platform.

\* \* \* \* \*